(12) United States Patent
Hegyi et al.

(10) Patent No.: US 10,302,494 B2
(45) Date of Patent: *May 28, 2019

(54) OBTAINING SPECTRAL INFORMATION FROM A MOVING OBJECT

(71) Applicant: Palo Alto Research Center Incorporated, Palo Alto, CA (US)

(72) Inventors: Alex Hegyi, San Francisco, CA (US); Joerg Martini, San Francisco, CA (US); Peter Kiesel, Palo Alto, CA (US); David K. Biegelsen, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/944,446

(22) Filed: Nov. 18, 2015

(65) Prior Publication Data
US 2017/0038258 A1 Feb. 9, 2017

Related U.S. Application Data

(63) Continuation-in-part of application No. 14/576,155, filed on Dec. 18, 2014.

(51) Int. Cl.
*G01J 3/447* (2006.01)
*G01J 3/02* (2006.01)
(Continued)

(52) U.S. Cl.
CPC ............. *G01J 3/447* (2013.01); *G01J 3/0224* (2013.01); *G01J 3/0229* (2013.01);
(Continued)

(58) Field of Classification Search
CPC ............ G01J 3/2823; G01J 2003/2826; G01J 3/45–3/457; G01J 15/14; G01J 15/1429–15/1463
See application file for complete search history.

(56) References Cited

U.S. PATENT DOCUMENTS 3,619,061 A 11/1971 Mitchell
4,009,962 A 3/1977 Lauer et al.
(Continued)

OTHER PUBLICATIONS

Ebizuka et al., "Development of a multichannel Fourier transform spectrometer", Applied Optics, vol. 34, Issue 34, 1995, pp. 7899-1906.
(Continued)

*Primary Examiner* — Tri Ton
*Assistant Examiner* — Rufus Phillips
(74) *Attorney, Agent, or Firm* — Hollingsworth Davis, LLC

(57) ABSTRACT

An optical device includes a waveplate sandwiched between first and second polarizers and is arranged to receive light emanating from an object or object image that is in motion relative to the optical device. A detector array includes one or more detector elements and is optically coupled to receive light from the second polarizer. Each detector element of the detector array provides an electrical output signal that varies according to intensity of the light received from the second polarizer. The intensity of the light is a function of relative motion of the object or the object image and the optical device and contains spectral information about an object point of the object.

20 Claims, 14 Drawing Sheets

(51) Int. Cl.
*G01J 3/45* (2006.01)
*G01J 3/453* (2006.01)
*G01J 3/28* (2006.01)
*G02B 5/04* (2006.01)
*G02B 5/30* (2006.01)
*G02B 27/28* (2006.01)

(52) U.S. Cl.
CPC ........... *G01J 3/0289* (2013.01); *G01J 3/2823* (2013.01); *G01J 3/45* (2013.01); *G01J 3/4531* (2013.01); *G02B 5/04* (2013.01); *G02B 5/3083* (2013.01); *G02B 27/283* (2013.01); *G02B 27/286* (2013.01)

(56) References Cited

U.S. PATENT DOCUMENTS

| | | | |
|---|---|---|---|
| 4,136,954 A | | 1/1979 | Jamieson |
| 4,320,973 A | | 3/1982 | Fortunato et al. |
| 4,542,295 A | | 9/1985 | Mattson et al. |
| 4,661,913 A | | 4/1987 | Wu et al. |
| 4,711,573 A | * | 12/1987 | Wijntjes ............... G01J 3/4535 318/640 |
| 4,867,565 A | * | 9/1989 | Lequime ...................... 356/453 |
| 4,905,169 A | * | 2/1990 | Buican et al. ................ 356/365 |
| 5,654,797 A | | 8/1997 | Moreau et al. |
| 5,741,640 A | | 4/1998 | Fuller |
| 5,781,293 A | | 7/1998 | Padgett et al. |
| 5,808,739 A | * | 9/1998 | Turner .................. G01J 3/4535 356/519 |
| 5,877,856 A | * | 3/1999 | Fercher .......................... 356/492 |
| 6,222,627 B1 | | 4/2001 | Seitz et al. |
| 6,421,131 B1 | | 7/2002 | Miller |
| 6,473,181 B1 | * | 10/2002 | Oakberg ....................... 356/365 |
| 6,490,530 B1 | | 12/2002 | Wyatt |
| 6,519,040 B1 | * | 2/2003 | Amos ........................... 356/453 |
| 7,106,435 B2 | * | 9/2006 | Nelson .......................... 356/300 |
| 7,358,476 B2 | | 4/2008 | Kiesel et al. |
| 7,440,108 B2 | * | 10/2008 | Beale et al. .................... 356/456 |
| 7,471,394 B2 | | 12/2008 | Padmanabhan et al. |
| 8,233,148 B2 | | 7/2012 | Bodkin et al. |
| 8,526,002 B2 | * | 9/2013 | DeFlores et al. .............. 356/451 |
| 2005/0058352 A1 | * | 3/2005 | Deliwala ................... G01J 3/02 382/232 |
| 2008/0181827 A1 | | 7/2008 | Bassler et al. |
| 2008/0183418 A1 | | 7/2008 | Bassler et al. |
| 2009/0195773 A1 | | 8/2009 | Kiesel et al. |
| 2009/0195852 A1 | | 8/2009 | Bassler et al. |
| 2010/0201988 A1 | | 8/2010 | Kiesel |
| 2014/0226158 A1 | * | 8/2014 | Trainer .................... G02B 6/32 356/336 |
| 2014/0340520 A1 | * | 11/2014 | Hay ............................. 348/148 |
| 2015/0253188 A1 | | 9/2015 | Killey |

OTHER PUBLICATIONS

Harvey et al., "Birefringent Fourier-transform imaging spectrometer", Optics Express, vol. 12, No. 22, Nov. 1, 2004, pp. 5368-5374.
Kudenov et al., "Compact Snapshot Real-Time Imaging Spectrometer", Proc. of SPIE, vol. 8186, 2011, 12 pages.
Zakrzewski et al., "Advancements in Hyperspectral and Multi-Spectral Imaging", retrieved from the internet on Oct. 1, 2015, 11 pages.
Kudenov et al., "Compact snapshot birefringent imaging Fourier transformspectrometer," Optomechatronic Micro/Nano Devices and Components III: Oct. 8-10, 2007, Lausanne, Switzerland, vol. 7812, Aug. 12, 2010, p. 781206/1.
Courtial et al., "Design of a Static Fourier-Transform Spectrometer with Increased Field of View," Applied Optics, Optical Society of America, Washington, DC, vol. 35, No. 34, Dec. 1, 1996, pp. 6698-6702.
Di Caprio, Giuseppe, Diane Schaak, and Ethan Schonbrun. "Hyperspectral fluorescence microfluidic (HFM) microscopy." Biomedical optics express 4.8 (2013): 1486-1493.
File History for EP App. No. 15198314.5 as retrieved from the EP Electronic File System on Aug. 5, 2016, 88 pages.
File History for U.S. Appl. No. 14/576,155.

* cited by examiner

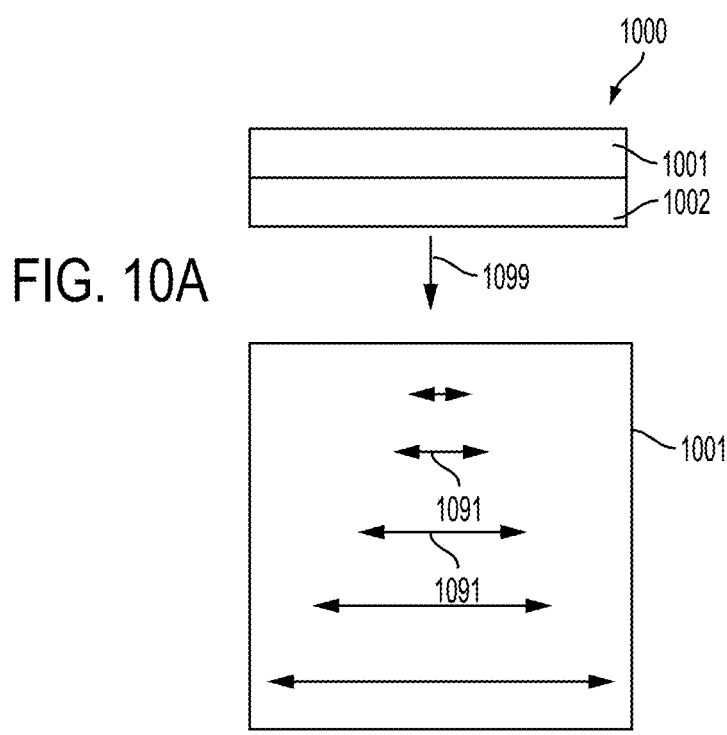
FIG. 10A
FIG. 10B
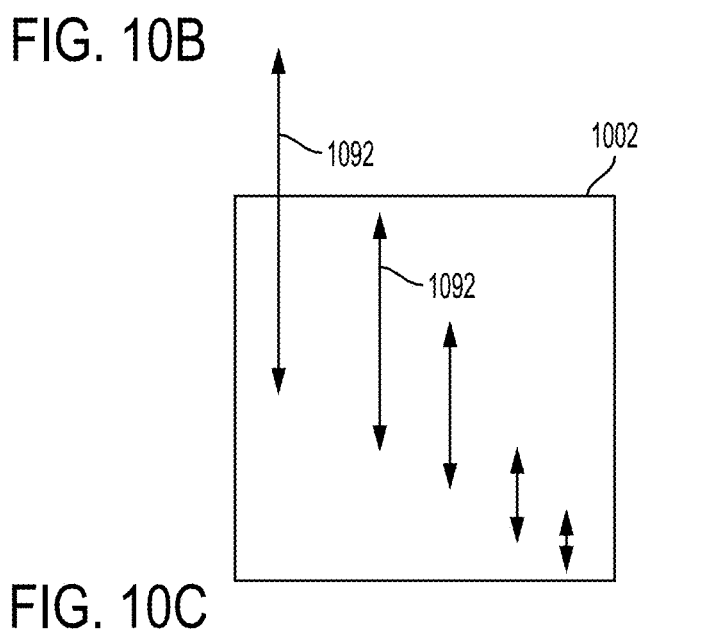
FIG. 10C

US 10,302,494 B2

OBTAINING SPECTRAL INFORMATION FROM A MOVING OBJECT

RELATED PATENT DOCUMENTS

This application claims priority as a Continuation-in-Part application under 35 U.S.C. § 120 to pending U.S. patent application Ser. No. 14/576,155, filed Dec. 18, 2014, which is incorporated herein by reference.

TECHNICAL FIELD

This disclosure relates generally to devices, systems and methods for spectral imaging.

BACKGROUND

Spectral imaging, including hyperspectral imaging, can provide spectral information from one or more points of an object. Hyperspectral imaging can combine spatial imaging and spectroscopy. For each coordinate position of an object, a hyperspectral imager obtains the light intensity for a large number, e.g., more than 10, or more than 100 spectral bands. Every position in the hyperspectral image thus contains the spectrum of the light at its corresponding object position. The hyperspectral image data can be used to characterize features of the object with precision and detail. Spectral imaging has applications in many fields including agriculture, astronomy, and biomedical imaging.

SUMMARY

Some embodiments described herein are directed to an optical device that includes a first polarizer arranged to receive light emanating from an object moving along a trajectory. The first polarizer polarizes the light emanating from the object along a first polarization direction. A waveplate is arranged to receive light from the first polarizer, the waveplate having an optical retardance that varies as a function of position along the trajectory direction and having a slow axis at a first angle, e.g., about 45 degrees, to the first polarization direction. A second polarizer is arranged to receive light from the waveplate. The second polarizer polarizes light received from the waveplate along a second polarization direction, wherein the second polarization direction may be about parallel or about perpendicular with respect to the first polarization direction. A detector comprising one or more detector elements is arranged to receive light from the second polarizer. Each detector element generates an electrical output signal in response to intensity variations in the light received from the second polarizer. The detector and the waveplate are arranged such that there is a fixed correspondence between each detector element and at least one particular retardance of the waveplate.

Some embodiments involve a system that includes an optical device and processor circuitry coupled to electrical outputs of the optical device. The optical device includes a first polarizer configured to receive light from an object or an image of the object which is moving relative to the optical device along a trajectory. The first polarizer polarizes the light along a first polarization direction. A waveplate is optically coupled to receive light from the first polarizer. The waveplate has an optical retardance that varies as a function of position along the trajectory and has a slow axis at a first angle to the first polarization direction. A second polarizer is optically coupled to receive light from the waveplate. The second polarizer polarizes light received from the waveplate along a second polarization direction that may be about parallel or about perpendicular to the first polarization direction. A detector array comprising a plurality of detector elements is optically coupled to receive light from the second polarizer. Each detector element of the detector array provides an electrical output signal that varies with time according to the intensity of the light received from the second polarizer. The intensity of the light is a function of the relative motion of the object or the object image and the optical device. The processor circuitry processes the electrical output signals of the detector elements and determines wavelength information about the object based on the electrical output signals.

Some embodiments are directed to a method of obtaining positional and spectral information from an object that emanates light. The method includes moving the object or image of the object relative to a waveplate. For one or more points of the object or the object image (referred to herein as object points/object image points), the positional information about the object is simultaneously detected while a position-dependent polarization interferogram is obtained from the emanating light as the object or object image moves relative to the waveplate. Spectral information corresponding to a given object point/object image point is determined from the position-dependent polarization interferogram recorded from the object point/object image point.

BRIEF DESCRIPTION OF THE DRAWINGS

FIGS. 10A through 10C are views of a waveplate made of first and second films, wherein each film has a birefringence gradient;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments described herein involve devices, systems, and methods for spectral imaging of objects ranging in size from microscopic to macroscopic objects. For example, some embodiments are directed to obtaining spectral information for small objects, e.g., living cells or other small particles. Other embodiments are directed to spectral imaging of larger objects such as terrestrial or extraterrestrial geographic features. Approaches discussed herein involve an optical device (also referred to as a spectral encoder) configured to obtain spectral information from an object (or from multiple objects) while the object or objects are in motion relative to the spectral encoder. Some approaches discussed herein involve a spectral encoder configured to obtain a spectral image, with a single or multiple spatial dimensions, of an object or an image of the object that is in motion relative to the spectral encoder. The spectral information may be obtained at high spectral resolution, without decreasing the optical throughput or the spectral bandwidth, by using the relative motion between the object or an image of the object and the optical device to generate a position-dependent polarization as discussed in more detail below.

In the embodiments described below, the spectral encoder converts the optical signal from light emanating from the object or an image of the object to an electrical signal, wherein the electrical signal encodes spectral information from more than one point of the object or object image in the electrical signal. In some embodiments, the object itself may be moving relative to the spectral encoder. In some embodiments, an image of the object may be moving relative to the spectral encoder. For example, the object itself may be stationary with respect to the spectral encoder while a moveable mirror is moved, causing an image of the object to move relative to the spectral encoder. In some embodiments, the moveable mirror may comprise a one dimensional or two dimensional array of moveable mirrors. The electrical signal generated by the spectral encoder can be processed by electrical circuitry, referred to herein as a processor, to extract the spectral information. Extraction of the spectral information can involve transformation of the electrical signal corresponding to an object point/object image point from time domain to frequency domain such as by performing a full Fourier transform of the electrical signal or a partial Fourier transform of the electrical signal at one or more predetermined frequencies of interest.

Figure 1A:
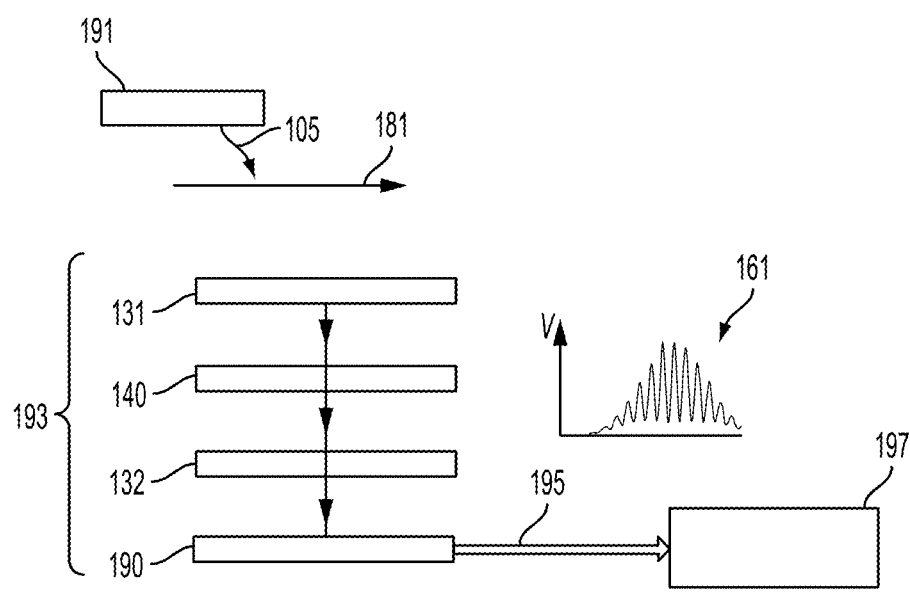
FIG. 1A is a block diagram of an imaging system in accordance with some embodiments.

FIG. 1A illustrates a system comprising an optical device 193 (spectral encoder) configured to provide an electrical signal 195 that includes spectral information about an object 191. In general, the size of the object 191 may range from microscopic or macroscopic. Microscopic objects may be imaged by the spectral encoder as a single object point/ object image point. Macroscopic objects may be imaged as multiple object points/object image points. Either the object 191 itself or an image of the object moves relative to the spectral encoder 193. Arrow 181 indicates the relative motion between the object 191 and the spectral encoder 193. Light 105 emanates from the object 191. For example, the emanating light 105 may be or comprise scattered light, reflected light, fluorescence light, phosphorescence light, chemiluminescence light, bioluminescence light, etc. At least some of the light 105 that emanates from the object 191 is received (directly or after redirection, e.g., by a moveable mirror) by the spectral encoder 193.

The emanating light 105 passes through a first polarizer 131 which polarizes the light along a first polarization direction. Light that has been polarized along the first polarization direction is received by a waveplate 140, e.g. a multiple (high) order waveplate, sandwiched between the first polarizer 131 and a second polarizer 132. The waveplate 140 has an optical retardance that varies as a function of position along the direction 181 of relative motion between the object or object image 191 (referred to herein collectively as "object/object image") and the spectral encoder 193. In some configurations, the retardance varies monotonically or linearly as a function of position along the trajectory of relative motion 181 between the object/object image 191 and the spectral encoder 193.

The second polarizer 132 shown in FIG. 1A represents one or more second polarizers. The polarization axes of the first and second polarizers 131, 132 may be arranged in either a parallel or perpendicular orientation, for example. In some implementations, the first and second polarizers 131, 132 are crossed polarizers, the first polarizer 131 having a polarization axis that is about 90 degrees from the polarization axis of the second polarizer 132. The slow axis of the waveplate 140 makes a first angle, e.g., about 45 degrees, with respect to the polarization axes of the first and second polarizers 131, 132.

The movement of the object/object image 191 relative to the position-dependent optical retardance of the waveplate 140 creates, for each point on the object and for each wavelength of light emanating from the object point/object image point, a time-dependent variation in polarization. The varying polarization of light is converted to a varying intensity of light by the second polarizer, and the intensities at all the wavelengths for a given object/object image position sum together to form a time-dependent interferogram. In some embodiments, the detector 190 may be a single detector element configured to detect light emanating from a single point of the object/object image. In some embodiments, the detector 190 may include multiple detector elements configured to detect light emanating from multiple object points/object image points across the object/ object image. For example, the multiple detector elements of a multiple-element detector may be arranged in a one-dimensional or two-dimensional detector array.

The position of the detector 190 is fixed relative to the waveplate 140 such that there is a fixed correspondence between each detector element of the detector 190 and one or more particular retardances of the waveplate 140. Each detector element of the detector 190 receives light from the second polarizer and converts the time varying intensity of light to a time varying electrical output signal, e.g., time varying voltage, at the output 195 of the detector 190. The intensity of light detected by each detector element of the detector 190 is a function of the relative position between a point of the object/object image 191 and the optical device 193. For narrow band light emanating from the object/object image 191, the time variation in the light intensity may be oscillatory, with oscillation period dependent on the center wavelength of the narrow band light. Here, oscillatory means that a number of oscillations N are clearly visible in the light intensity, and narrow band light means that the center wavelength of the light divided by the spectral bandwidth is on the order of N or greater. Graph 161 illustrates an example of the time varying output signal of one detector element of the detector 190 associated with a point of the object/object image moving relative to the optical device 193 along trajectory 181 while emanating light in a narrow band of wavelengths. The output signal 195 includes information about the spectrum of light emanating from each object point of the object/object image 191. The output signal 195 can be analyzed by electronic circuitry, e.g., processor 197 to extract the spectrum of light emanating from each point of the object/object image 191.

The processor 197 can be programmed to use the predetermined correspondence between the detector elements and the retardances of waveplate positions to determine the spectrum of light from each point of the object/object image. In embodiments that include a detector having multiple elements, there may be a one-to-one correspondence between a detector element and a point on the waveplate 140 associated with a particular retardance, such as if imaging optics are placed between the waveplate 140 and the detector 190. In some embodiments, one of the detector elements corresponds to multiple retardances (multiple positions) on the waveplate.

In some embodiments, correspondence between retardances of the waveplate and the detector elements may be set by the fixed positions of the waveplate and the detector array. In some embodiments, a micro-mirror array may be disposed at any location along the principal optical axis of the spectral encoder to provide a correspondence between the detector elements and waveplate retardances that is different from the correspondence resulting from the fixed positions. For example, in one embodiment, light emanating from the object points/object image points is first imaged onto the waveplate by a first imaging optical component and light from the waveplate is imaged onto the multi-element detector by a second imaging optical component including a micro-mirror array such that the correspondence between the detector elements and the waveplate retardances is established by the micro-mirror array.

There are a number of applications for the spectral encoder described herein. Of particular interest is the use of the spectral encoder in flow cytometry. FIGS. 1B through 5 illustrate a spectral encoder deployed in an application such as a flow cytometer where the spectral encoder is configured to observe small or microscopic objects that move relative to the spectral encoder along a trajectory. These approaches may employ single element detectors (also referred to as single pixel detectors) to observe the object as a single object point/object image point or may employ multi-pixel detectors, in which case multiple small or microscopic particles may be observed. In flow cytometers that use multi-element detectors (also referred to as multi-pixel detectors), the spectral encoder may be configured to resolve small, overlapping particles in the flow channel of the flow cytometer, for example. The techniques described in connection with FIGS. 1B through 5 are applicable to spectral encoders employing single or multi-pixel detectors. The multi-pixel spectral encoders can be configured to obtain spectral information from macroscopic objects wherein the objects are observed by the spectral encoder as multiple object points/ object image points.

Figure 1B:
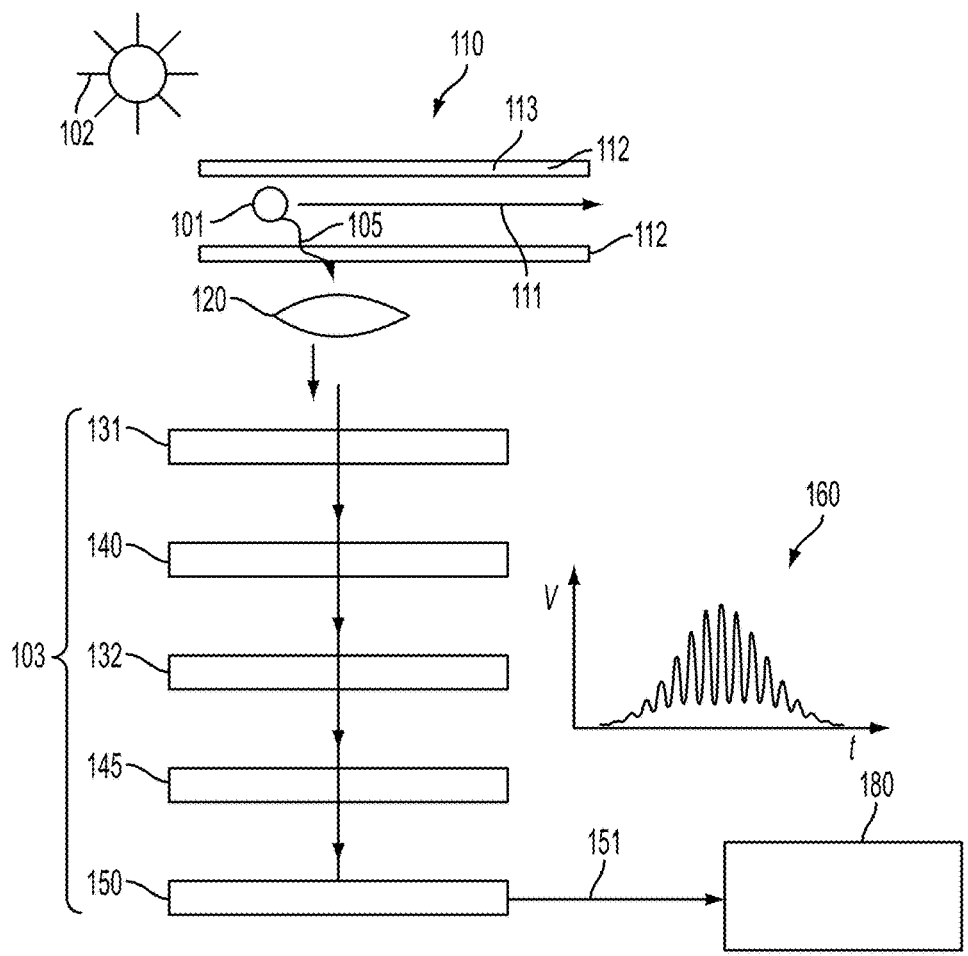
FIG. 1B is a block diagram of a system configured to obtain spectral information from an object in accordance with some embodiments.

FIG. 1B illustrates a system comprising an optical device 103 (also referred to herein as a spectral encoder) configured to provide an electrical signal that includes information about characteristics of a moving object. FIG. 1B shows one or more moving objects 101 moving in a trajectory 111 along a flow path 110. In some implementations, the flow path may be disposed between channel walls 112 that form a flow channel 113, the channel walls 112 of the flow channel 113 constraining the object movement to trajectory 111. Although not shown in FIG. 1B, in some embodiments, a fluid movement device, e.g., comprising one or more pumps and/or one or more valves, may be coupled to the fluid in the flow channel between the channel walls 112, wherein the fluid movement device is configured to cause the movement of the object 101 along the trajectory 111. Light 105 emanates from each of the objects 101. Optionally, the optical device 103 may include a light source 102 configured to provide input light that interacts with the objects 101. In response to the input light, the objects emanate light. For example, the emanating light 105 may be or comprise scattered light, reflected light, fluorescence light, phosphorescence light, chemiluminescence light, bioluminescence light, etc.

In embodiments that include flow channel walls, at least one of the walls may be optically transparent to the input light and at least one of the walls may be optically transparent to the emanating light 105. The optical device 103 includes one or more first polarizers, represented in this example by first polarizer 131. The first polarizer 131 is configured to receive the light 105 emanating from the object 101. Optionally, a lens 120 may be arranged between the object and the first polarizer 131 such that the lens 120 focuses the emanating light 105, e.g., halfway between the surfaces of the waveplate 140. Alternatively, the trajectory 111 of the object may bring the object 101 sufficiently close to the waveplate 140 so that a lens is not needed. In embodiments that include a lens, the lens can be configured to be chromatically correct so that all frequencies of light are substantially focused halfway between the surfaces of the waveplate 140.

The emanating light 105 passes through the first polarizer 131 which polarizes the light along a first polarization direction. Light that has been polarized along the first polarization direction is received by a waveplate 140, e.g. a multiple (high) order waveplate, sandwiched between the first polarizer 131 and a second polarizer 132. The waveplate 140 has an optical retardance that varies as a function of position along the trajectory direction 111 of the object 101. In some configurations, the retardance varies monotonically or linearly as a function of position along the trajectory direction 111 of the object 101. In some configurations, the waveplate may be a Wollaston prism or other optical retardance device, positioned such that there is about zero optical retardance between the two polarizations of light after propagation through the waveplate when the object is roughly at the center of the field of view of the detector. This ensures that the recorded interferogram is substantially centered about its zeroth order fringe.

The second polarizer 132 shown in FIG. 1B represents one or more second polarizers. The polarization axes of the first and second polarizers 131, 132 may be arranged in either a parallel or perpendicular orientation. In some implementations, the first and second polarizers 131, 132 are crossed polarizers, the first polarizer 131 having a polarization axis that is about 90 degrees from the polarization axis of the second polarizer 132. The slow axis of the waveplate 140 makes a first angle, e.g., about 45 degrees, with respect to the polarization axes of the first and second polarizers 131, 132.

The object's movement relative to the position-dependent optical retardance of the waveplate 140 creates a time-dependent variation in polarization of the emanating light that is dependent on the optical spectrum of the light. The varying polarization of light is converted to a varying intensity by the second polarizer 132. A detector 150, e.g., a single pixel detector, converts the time varying intensity of light to a time varying electrical output signal, e.g., time varying voltage, at the output 151 of the detector. For narrow band light, the time variation in the light intensity may be oscillatory, with oscillation period dependent on the center wavelength of the band. Graph 160 illustrates an example of the time varying output signal of the detector associated with one object moving along the trajectory 111 while emanating light in a narrow band of wavelengths. The output signal includes information about the object 101, such as the spectrum of the light emanating from the object.

Optionally, the optical device 103 includes one or more optical filters 145. For example, in various embodiments, an optical filter may be arranged anywhere in the light path between the object 101 and the detector 150, e.g., between the second polarizer 132 and the detector 150 as shown in FIG. 1B. The optical filter 145 can serve to limit the bandwidth of the light incident on the detector 150 to a bandwidth range of interest which simplifies signal processing. In some cases, limiting the bandwidth of the light received by the detector allows full recovery of the spectral information from the optical interferogram generated by the motion of the object, even if the electrical signal generated by the interferogram is sampled below the Nyquist limit (two samples per interference fringe for the shortest detected wavelength).

The system shown in FIG. 1B includes a processor 180 coupled to receive the electrical output signal from the detector 150. The processor 180 includes circuitry, such as a computational processor that executes programmed instructions, configured to process the output signal to extract spectral information about the object 101. Note that the size of the object or its image may be small with respect to the positional variation of the retardance of the waveplate 140, so that the light interference fringes generated by each point of the object/object image are substantially in-phase when detected by a single pixel or element of the detector 150. For example, if N interference fringes are to be recorded as the object/object image traverses a waveplate with a linearly increasing retardance as a function of position along the trajectory direction 111, the size of the object/object image 101 along the trajectory direction 111 may be about ½N of the length of the waveplate 140 along the trajectory direction 111, or smaller, to resolve the interference fringes.

Figure 2:
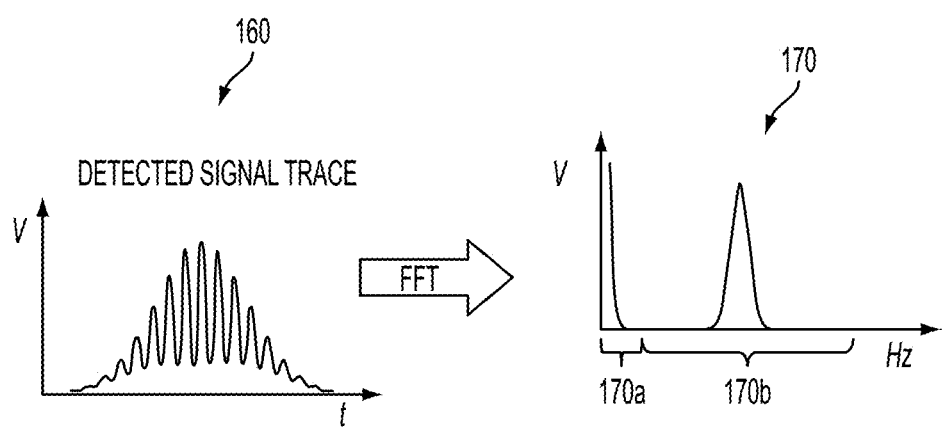
FIG. 2 illustrates conversion of the detector output to a frequency domain signal in accordance with some embodiments.

The output of the detector can be processed, e.g., such as by Fourier transformation or other time to frequency domain transformation, to determine the optical spectrum of the light emanating from the object. As shown in FIG. 2, the transformed output signal 170 may include lower frequency components 170a and higher frequency components 170b. The lower frequency components 170a are associated with the envelope of the signal 160 and the higher frequency components 170b correspond to the optical spectrum of the emanating light.

In one example, the waveplate is a Wollaston prism having a wedge angle α, where wedge angle is defined as the angle between the front face of the prism which is normal to the principal optical axis of the spectral encoder, and the interior face where the two halves of the prism are cemented together. The slow axes of the prism may be oriented at about 45 degrees with respect to the polarization axes of the polarizers. The wedge direction of the prism is defined as the direction, in a plane parallel to the front face of the prism, along which the thicknesses of the two halves of the prism trade off the fastest. It is preferable to align the prism's wedge direction with the object's trajectory, and to align the slow axes at 45 degrees to the wedge direction. If the desired spectral resolution at wavelength λ is λ/N, N fringes must be recorded as the object traverses across the field of view. If the travel distance of the object or the image of the object is L along the wedge direction of the Wollaston prism with birefringence Δn, the wedge angle of the Wollaston should be $\alpha \approx N\lambda/2L\Delta n$. The maximum spectral bandwidth is limited by the sample rate of the detector signal, which must be fast enough to record the observed fringes. The spectral bandwidth is also limited by the size of the object. If the object diameter is d, then the maximum number of fringes that can be recorded by the detector is approximately L/2d, so the minimum detectable wavelength is $\lambda \approx 4\alpha d\Delta n$.

According to the approaches discussed herein, the object's motion is used to encode spectral information in the time varying signal of at least one single-pixel detector. Using these approaches, it is possible to use one single-pixel detector with a single output to obtain the emanating light spectrum, and there is no significant loss of optical throughput with increasing spectral resolution as occurs with conventional spectroscopy. In some implementations, the outputs of two or more single pixel detectors are combined to enhance signal to noise ratio of the combined signal.

Figure 3:
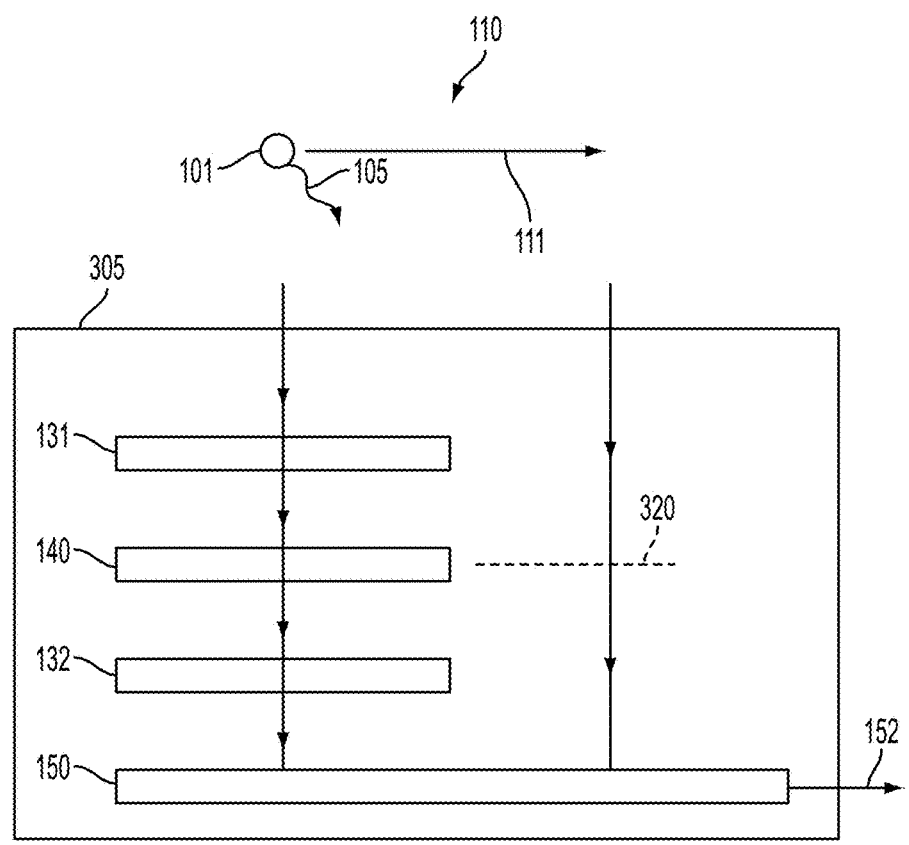
FIG. 3 shows an optical device that includes a spatial filter in accordance with some embodiments.

FIG. 3 shows optical device 305 that is similar in some respects to the optical device 103 of FIG. 1B. Optical device 305 includes a waveplate 140 sandwiched between first and second polarizers 131, 132. The emanating light 105 from moving object 101 traveling along trajectory 111 passes through the first polarizer 131 which polarizes the light along a first polarization direction. The light polarized by the first polarizer is received by a waveplate 140 that has an optical retardance that varies as a function of position along the trajectory direction 111.

At each wavelength, the optical retardance between two polarizations in the emanating light introduced by the waveplate 140 creates a varying polarization that is dependent on the wavelength. The varying polarization of light is converted to a varying light intensity by the second polarizer 132. The light from the second polarizer falls on detector 150. In some configurations, the light is filtered by optional optical filter 145 which is arranged in the light path between the second polarizer 132 and the detector 150.

Optical device 305 additionally includes a spatial mask 320 that includes a number, e.g., 3, 4, 5, or more, mask features that are optically transparent to the emanating light alternating with 3, 4, 5, or more optically opaque mask features. A portion of the light 105 emanating from the object may be imaged on the spatial mask 320. The spatial mask 320 interacts with the light emanating 105 from object 101 and the interaction creates a time varying light that is incident on the detector 150. It will be appreciated that the movement of object 101 along the trajectory may provide a time multiplexed signal at the output 152 of the detector 150. The time multiplexed signal at the output 152 of the detector 150 includes a first time multiplexed portion that corresponds to the varying light intensity from the second polarizer 132 and a second time multiplexed portion that corresponds to the time varying light caused by the interaction between the emanating light 105 and the spatial mask 320. It will be appreciated that the optical device 305 may optionally be arranged so that the first portion of the output signal 152 corresponds to the time varying light from the spatial mask 320 and the second portion corresponds to the varying intensity at the output of the second polarizer 132. The first time portion of the signal responsive to the varying intensity light from the second polarizer may be processed to extract first information about the object, e.g., the optical spectrum of the light emanating from the object. The second portion of the signal responsive to the time varying light caused by interaction of the emanating light with the spatial mask may be processed to extract second information about the object, such as velocity and/or size of the object. The second information may be used to apply a correction to the first information, such as using object velocity information to calibrate the wavelength scale of the optical spectrum.

According to some implementations, the output signal can be analyzed without time demultiplexing the signal 152 into the first and second portions. This scenario may occur when the optical bandwidth of the light 105 emanating from the object 101 is known not to exceed a certain range so that the fringes of the interferogram detected at the detector should also lie within a certain bandwidth. If this is the case, then a portion of the emanating light can be imaged onto the spatial mask which may be placed adjacent to the waveplate as shown, e.g., half the emanating light falling on the spatial mask, while simultaneously half of the emanating light falls on the first polarizer as shown. The intensity variations caused by the spatial mask lie outside of the frequency range of the interferogram fringes generated by the polarizer/waveplate/polarizer structure. Thus, light falling on the polarizer/waveplate/polarizer structure and light falling on the spatial mask can be combined onto the same detector 150. The electrical output signal component responsive to the polarizer/waveplate/polarizer structure and the signal component responsive to light modulated by the spatial mask in the output signal 152 can be separated in software. This separation is possible because the light from the polarizer/waveplate/polarizer structure lies in a frequency range that is substantially orthogonal to the spatially modulated light from the spatial mask.

Figure 4:
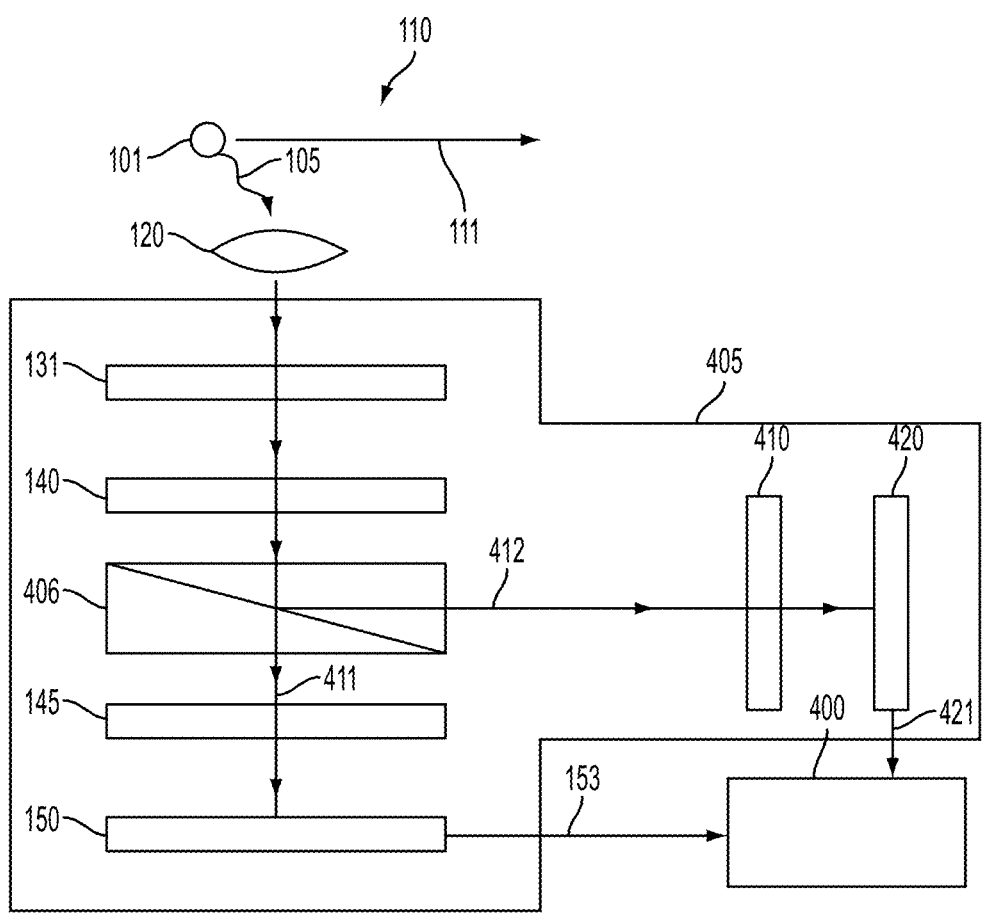
FIG. 4 depicts an optical device that includes a polarizing beamsplitter and multiple detectors in accordance with some embodiments.

In some embodiments, each of the first and second polarizers can optionally be replaced by a polarizing beamsplitter. In some embodiments, two (or more) single pixel detectors can be used to detect light having different polarizations. FIG. 4 illustrates an optical device 405 that includes a polarizing beamsplitter 406 in the place of the second polarizer shown in FIG. 3. The first polarizer 131 polarizes the light emanating 105 from the object 101 along a first polarization direction. The polarizing beamsplitter 406 splits the light from the waveplate 140 into light 411 polarized along a second polarization direction and light 412 polarized along a third polarization direction. For example, one of the polarization axes of the polarizing beamsplitter 406 could be chosen to lie parallel to the polarization direction of the first polarizer 131. Detector 150 is arranged to detect light 411 polarized along this second direction. Detector 420 is arranged to detect light 412 polarized along the third polarization direction, which is perpendicular to the second polarization direction. Optional components 145, 410 may be respectively disposed in the light path between the polarizing beam splitter 406 and detector 150 and/or in the light path between polarizing beam splitter 406 and detector 420. In some embodiments, the optional components 145, 410 comprise optical filters that optically filter light 411 and 412. In some embodiments, component 145 and/or component 410 may be or comprise a spatial mask. Components 145, 410 can additionally include optics that image the emanating light from the object or object image onto the spatial filters. The outputs 153, 421 of the detectors 150, 420 are both coupled to processor 400. The processor 400 may be configured to analyze outputs to enhance optical throughput and signal to noise ratio of the optical device.

In embodiments in which components 145 and/or 410 comprise spatial masks, the processor 400 can extract additional information about the objects, such as object speed and/or size, based on time variation in the electrical signal caused by the spatial mask. Interaction of the emanating light with a spatial mask generates frequency components in the electrical output signal 153, 421 of a detector 150, 420 that can be discriminated from the frequency components that result from varying light intensity caused by a time dependent variation in polarization.

Figure 5:
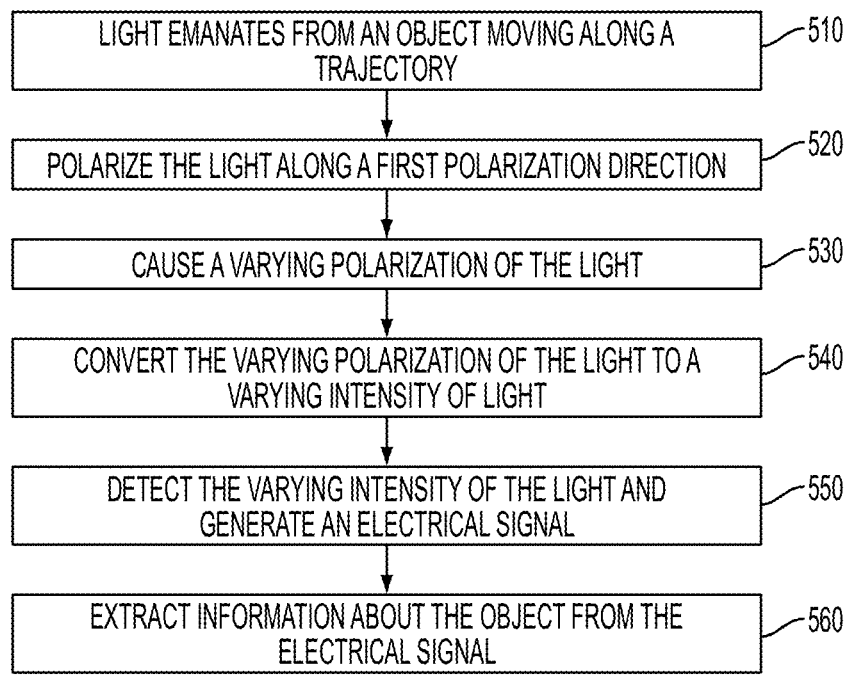
FIG. 5 is a flow diagram illustrating a method according to a some embodiments.

FIG. 5 is a flow diagram of a method of operating the optical detector and processor discussed herein. Light emanates 510 from one or more objects moving along a trajectory. The emanating light is polarized 520 along a first polarization direction. A varying polarization of the light is created 530 by a waveplate having a variable retardance along the trajectory of the object. The varying polarization is transformed 540 into a time varying intensity of light. A time varying electrical signal is generated 550 in response to the time varying intensity of light. The time varying electrical signal includes information about one or more characteristics of the object. For example, the information may be encoded in the fluorescence spectrum of light emanating from the object. The time varying electrical signal is analyzed 560 to extract information about the spectrum of the light emanating from the object.

In some implementations, such as flow cytometry, it is useful to have the capability of detecting light in individual channels across a relatively wide optical bandwidth range. Traditionally this has been accomplished using optical bandpass filters to define the individual fluorescence channels that are fixed by the hardware. Another technique has used a prism to disperse light and a photomultiplier tube array to detect the dispersed light. Still other techniques rely on the use of spatial modulation of the emanating light that is resolved into channels by a linear variable filter, with each position along the filter transmitting a different optical band. Drawbacks to these techniques include inflexibility due to hardware limitations, expensive detector arrays, and/or loss of spectral resolution and/or optical throughput. Approaches described herein can be employed to mitigate these factors.

Approaches described herein provide for detecting the spectra at high spectral resolution of light emanating from one or more moving objects. These approaches work with detectors that have as few as one pixel, and are absent of tradeoffs between optical throughput and spectral resolution that affect conventional forms of spectroscopy. These approaches involve using the object's motion to generate an interferogram and to convert the interferogram to an electrical signal using a detector with as few as one pixel. In some implementations only one detector is used and in some cases multiple pixel detectors are used. Spectral information of the emanating light is encoded in the electrical signal, for example in the frequency domain of the electrical signal. The spectral information, if it is encoded in the frequency domain, can be extracted from the output signal of the detector using a time domain to frequency domain transformation such as a Fourier transform. As in other forms of Fourier spectroscopy, light at all wavelengths is recorded simultaneously, so there is no tradeoff between spectral resolution and optical throughput.

In various embodiments, the optical device and/or processor shown and described, for example, in FIGS. 1B-5 may be implemented in a flow cytometer that can be configured to analyze objects and/or analytes that are bound to the objects present in a sample. In these embodiments, the processor may have the capability of processing the electrical signal using one or multiple processing channels wherein each processing channel corresponds to a particular fluorescence channel of the flow cytometer. The processing channels may be electrical hardware channels and/or may be reconfigurable software channels. For example, in some implementations, the emanating light from objects moving in the flow channel of the flow cytometer is detected, transformed to an electrical signal, sampled, and stored. Information may be extracted from each processing channel by passing the electrical signal through one or more analog and/or digital electronic filters. For example, each processing channel may correspond to a spectral slice (frequency range) of the electrical signal. In some implementations, the processor can be programmed to automatically determine the processing channels to be used, e.g., the number and/or frequency ranges of channels that are optimal for the optical signal, based on the expected and/or observed spectral components of the electrical signal. In some embodiments, the processor may determine optimal filter coefficients and/or configurations for the channel filters. The channel filters can be modified before and/or during operation of the flow cytometer, e.g., either manually or automatically.

In some embodiments, the processor can be configured to determine an optimal number of processing channels and/or optimal frequency ranges of the processing channels using a clustering algorithm. According to some implementations, to determine the optimal channels, the processor analyzes the electrical signal and identifies groups of different object populations that are clustered based on spectral information. These clustered groups are then used to determine the optimal number and/or frequency ranges of the processor channels. In some implementations, the electronic filters can be modified either manually or automatically during operation. In some implementations, processor channels can consist of combinations of other processor channels.

As previously discussed, in some implementations, more than one detector may be used wherein each detector detects a different polarization of the emanating light. The electrical signals from each of the detectors and/or time domain to frequency domain transformations of these signals may be stored, combined, and/or used to analyze the spectra of light emanating from the one or more objects. For example, if optical signals of orthogonal polarizations were detected by the same detector, the oppositely polarized optical signals would tend to cancel each other out because the interferogram measured at one polarization has the opposite phase as the interferogram measured at an orthogonal polarization. Using two detectors, the signals from each of the detectors can be processed before combining so that the signals are in phase and thus additive rather than subtractive. For example, the time varying signal from one of the detectors may be phase inverted, or the signals from both detectors may be transformed from the time domain to the frequency domain, prior to combining. The combination of the two signals can increase the optical throughput of the optical device relative to a single signal and, correspondingly, the signal to noise ratio of the combined signal is increased. In some scenarios, a polarizing beamsplitter is used in place of each of the first and second polarizers. In these scenarios, it is necessary to place two waveplates or Wollaston prisms after the first polarizing beamsplitter, so there is one waveplate for each polarization exiting the first polarizing beamsplitter. Each waveplate or Wollaston should be oriented so that a slow axis is about 45 degrees with respect to a polarization axis of the beamsplitter. The wedge axis of the waveplate or Wollaston, i.e., the direction transverse to the waveplate or Wollaston's thickness direction along which the optical retardance varies, should be about parallel with the object trajectory. A polarizing beamsplitter and a pair of detectors is then placed after each waveplate, with a polarization direction parallel to one of the polarization directions of the first polarizing beamsplitter. Thus, in total, there are three polarizing beamsplitters and four detectors, each detector arranged to detect one of the two light polarized light beams produced by the second or third polarizing beamsplitters. By detecting all polarization combinations of light, this configuration with four detectors has up to four times the optical throughput as the single-pixel detector configuration. In some embodiments, the two interferograms of one phase are combined onto one detector, and the two interferograms of the opposite phase are combined on the other detector, so in total only two detectors are needed.

In some embodiments, the processor may first detect and trigger on the presence of an object in the flow path based on characteristics of the electrical signal, such as whether the electrical signal's amplitude lies above a threshold value. The triggered portion of the signal, perhaps including pretrigger and posttrigger samples, may be selected for further processing, such as transformation to the frequency domain. The spectral information associated with each detected object is encoded in the frequency components of the electrical signal. When the frequency components associated with the optical spectra of light emanating from different types of objects differ, the processor can discriminate objects of different types based on transformations of the electrical signal.

In some embodiments, the analysis may only include transformation of certain frequency ranges or portions of the electrical signal, rather than a full transformation across a wide frequency range. In these embodiments, optical filters may be placed before the detectors, or the processor may use software and/or hardware digital and/or analog filters, to remove or reduce frequency components in the signal that are not of interest prior to performing the time domain to frequency domain transformation. Or, the processor may use software and/or hardware digital and/or analog filters as a means to directly pick out frequency components of interest in the electrical signal, in some cases obviating further transformation.

Approaches described herein allow flexibility in processing the entire frequency range of the electrical signal or processing only specified portions of the frequency range (frequency slices) of the electrical signal that correspond to colors (optical spectrum ranges) of interest without the need to process other frequency ranges that are not of interest. In some embodiments, the processing makes use of adaptable filters having parameters that can be automatically adjusted by the processor and/or can be semi-automatically adjusted based on some input from the user. For example, in one scenario, the processor may determine which frequency components are present in the electrical signal and determine the number and frequency ranges of the filters used. In another scenario, a user may input information related to expected frequency ranges of the electrical signal (or frequency ranges of interest) and the processor may initially use those frequency ranges to set up the filters and may automatically make adjustments.

The processor may determine the frequency range(s) in the electrical signal corresponding to optical spectra of interest using a clustering algorithm to group frequencies or frequency ranges of object populations and to determine the highest fidelity separation between object types present in a sample based on variation of these frequency ranges. In some embodiments the clustering algorithm may be or comprise a principal component analysis of the electrical signal. For example, consider the scenario wherein the clustering algorithm identifies M different object types corresponding to M optical spectra and M principal components of the electrical signal. The processor can then detect the object types having any of those M optical spectra of interest by performing a dot product of each of the M principal components with the electrical signal in the time domain. The results of the dot product comprise a vector in a subdivided M-dimensional space, whereby the presence of the vector in one region of that space may indicate that an object of a particular type has been detected. Fourier transformation of the electrical signal may not be necessary when utilizing this technique.

In some embodiments, the processor is capable of correcting for errors caused by physical properties of the waveplate and/or other optical components of the optical device. For example, consider that the number of fringes is dependent on wavelength and on birefringence Δn. However, due to optical dispersion, birefringence is also dependent on wavelength, thus a correction factor is needed to accurately relate the frequency of the electrical signal to the optical spectrum of the object. Otherwise, calibration at one frequency of the electrical signal (Fourier component) would not be applicable across other frequencies/Fourier components. This correction factor may be determined and applied for in the processor, for example using the known wavelength dependence of the birefringence.

In general, light from an object/object image point incident on the waveplate will be substantially collimated. However, software correction may also be needed to account for the difference in optical retardance as a function of angle of the chief ray emanating from an object/object image point. The changing angle is caused by a change in position of the moving object as it or its image moves laterally across the waveplate surface.

Figure 6:
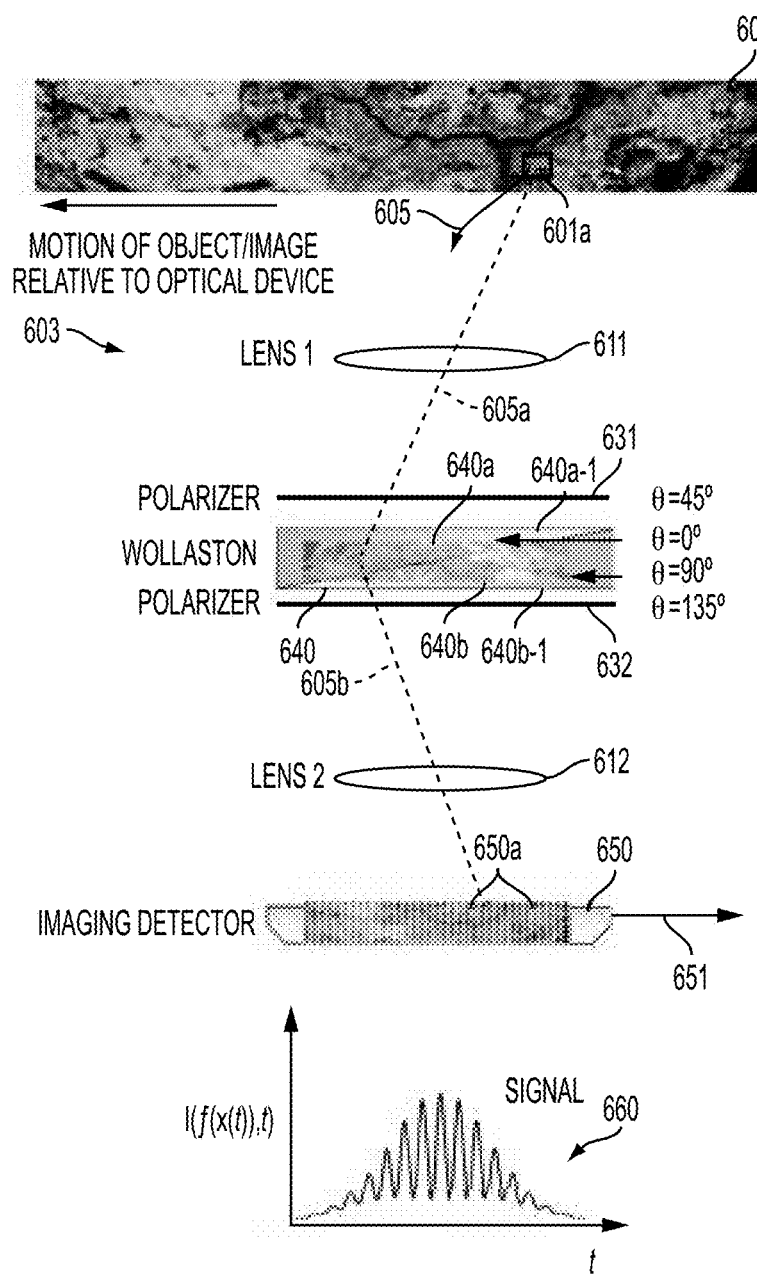
FIG. 6 is a block diagram of an imaging system that includes a detector array having multiple detector elements.

FIG. 6 illustrates a system comprising a spectral encoder 603 useful for spectral imaging of macroscopic objects such as a geographic scene. The spectral encoder may also be useful for spectral imaging of multiple small or microscopic objects e.g., multiple particles moving through a cytometer flow channel.

FIG. 6 shows a macroscopic object or object image, e.g., geographic scene 601, moving relative to the spectral encoder 603. The macroscopic object/object image 601 can be divided into multiple regions 601a referred to herein as "object points/object image points." The relative movement between the object/object image 601 and waveplate 640 produces a time dependent relationship between each of the object points/object image points 601a and optical retardances on the waveplate. Light 605, e.g., reflected light, fluorescence light, phosphorescence light, chemiluminescence light, bioluminescence light, etc., emanates from each of the object points/object image points 601a. The optical device 603 includes at least one first polarizer, represented in this example by first polarizer 631. The first polarizer 631 is configured to receive the light 605 emanating from the object/object image 601. Optionally, a lens 611 or other optical component may be arranged between the object/object image 601 and the first polarizer 631 or between the first polarizer and the waveplate such that the lens 611 focuses the emanating light 605 onto the waveplate 640, e.g., halfway between the surfaces 640a-1, 640b-1 of the waveplate 640 as indicated by dashed lines 605a and 605b. In embodiments that include a lens, the lens can be configured to be chromatically correct so that all frequencies of light are substantially focused halfway between the surfaces of the waveplate. In some implementations, the lens may be a telecentric lens.

Optical setup (for example, adjusting the focus of this first lens 611) can involve ensuring that for each position of the object/object image along the path of relative motion between the object/object image and the spectral encoder, the rays corresponding to a given object point/object image point 601a are all imaged at the same position of the waveplate 640 and thus see the same retardance, otherwise the interferogram may lose contrast. In this case, "same position" means that for a given wavelength, the phase variation of the rays that traverse a position region considered to correspond to the "same position" differ by no more than about π/2 radians.

In some embodiments, a coded aperture mask may be used, e.g., in the position of the lens 611 or lens 612. The processor computationally reconstructs the spectral image of the object including both spectral and positional information by incorporating knowledge of the coding pattern of the coded mask into transformations of the signals obtained by the detector array.

The emanating light 605 passes through the first polarizer 631 which polarizes the light along a first polarization direction. Light that has been polarized along the first polarization direction is received by a waveplate 640, e.g. a multiple order waveplate, sandwiched between the first polarizer 631 and a second polarizer 632. The waveplate 640 has an optical retardance that varies as a function of position along the trajectory of relative motion of between the object/object image 601 and the spectral encoder 603. In some configurations, the retardance of the waveplate 640 varies monotonically or linearly as a function of position along the trajectory of relative motion. The second polarizer 632 shown in FIG. 6 represents one or more second polarizers. The polarization axes of the first and second polarizers 631, 632 may be arranged in either a parallel or perpendicular orientation with respect to one another. In some implementations, the first and second polarizers 631, 632 are crossed polarizers, the first polarizer 631 having a polarization axis that is about 90 degrees from the polarization axis of the second polarizer 632. In some embodiments, the slow axis of the waveplate 640 makes a first angle, e.g., an angle of about 45 degrees, with respect to the polarization axes of the first and second polarizers 631, 632.

As shown in FIG. 6 the waveplate 640 may comprise a Wollaston prism with a first half 640a having a first optical axis or slow axis and a second half 640b having a second optical axis or slow axis wherein the first and second optical axes of the Wollaston prism are mutually orthogonal and parallel to the entrance and exit faces of the Wollaston. The optical axis or slow axis of a uniaxial birefringent layer, such as a Wollaston prism half, is the axis along which light travels at the same speed, regardless of its polarization. When light travels through a uniaxial birefringent layer along directions other than the optical axis, the light is refracted into two rays each polarized with the vibration directions oriented at right angles to one another and traveling at different velocities. For example, in some embodiments, the optical axis of the first half 640a of the Wollaston prism may be oriented parallel to the wedge direction of the prism half 640a and the optical axis of the second half 640b of the Wollaston prism may be oriented perpendicular to the optical axis of the first half 640a. In some embodiments, the polarization directions of the first and second polarizers can be mutually orthogonal with the polarization direction of the first polarizer oriented at an angle of 45 degrees with respect to the optical axis of the first half 640a of the Wollaston prism and the polarization direction of the second polarizer oriented at an angle of 135 degrees with respect to the optical axis of the first half 640a of the Wollaston prism as indicated in FIG. 6. In some embodiments, the optical axes of the Wollaston prism may be disposed at ±45° with respect to the prism's wedge direction.

The movement of each object point/object image point 601a of the object/object image relative to the position-dependent optical retardance of the waveplate 640 creates a time-dependent variation in polarization of the light emanating from the object point/object image point. The time-dependent variation in polarization is dependent on the optical spectrum of the emanating light. The varying polarization of light is converted to a varying intensity by the second polarizer 632. A detector 650, e.g., a spatially resolving or imaging detector comprising multiple detector elements 650a, converts the time varying intensity of light from each object point/object image point 601a to a position and time varying electrical output signal, e.g., position and time varying voltage, at the output 651 of the detector 650. The spectral encoder described herein is configured to simultaneously obtain spectral and spatial information for multiple object points/object image points. Scanning the object/object image relative to the waveplate to generates a position-dependent polarization interferogram for each object point/object image point that includes spectral information for each object point/object image point. Spectral information corresponding to a given object point/object image point is determined from the position-dependent polarization interferogram recorded from the object point/object image point.

In some embodiments, the position-dependent polarization interferogram is converted to a time varying electrical signal by sampling the positions of the detector array corresponding to the position of an object point/object image point at each point in time. That is, the position and time varying electrical output signal 651 of the detector 650 provides time varying electrical outputs for each detector element position. The position-dependent polarization interferogram generated by one object point/object image point traverses different detector elements at different times. By stitching together in time successive detector element signals generated from one object point/object image point as the light emanating from the object point/object image point and passing through the spectral encoder lands on these successive detector elements, the position and time varying electrical signal generated by one object point/object image point can be turned into a time varying electrical signal. This is explained mathematically below. The time varying electrical signal can be processed, e.g., by time domain to frequency domain transformation, to extract the spectral information for the object point/object image point.

The relative motion between the spectral encoder and the object/object image, assumed known, causes a given object point/object image point 601a to traverse at position x(t) the multi-element, spatially resolving detector. The detector's response at a given point in image space X and given point in time t is I(X,t). If f is the function that images an object onto the detector, then X=f(x(t)). If a given object point/object image point traverses the detector in time t∈(0, T), then that object point's/object image point's interferogram S can be given by S(t)=I(f(x(t)),t) with t ∈(0, T). Each point in image space X and hence each point in time t corresponds to a known retardance $\Gamma$=g(X)=g(f(x(t))). With this information, the interferogram as a function of retardance S($\Gamma$) =I(g$^{-1}$($\Gamma$),x$^{-1}$(f$^{-1}$(g$^{-1}$($\Gamma$)))) can be obtained, for example via a computation by the processor or other host system that the spectral encoder is attached to. Performing a Fourier transformation with respect to the retardance yields the optical spectrum of the light recorded from a given object point/object image point.

The spatial and spectral information obtained from multiple object points/object image points of the object/object image can be arranged by the processor in a data set comprising a hyperspectral data square having axes x (one spatial dimension, along the trajectory direction) and $\lambda$ (wavelength), or a hyperspectral data cube having axes x, y (two spatial dimensions, one along the trajectory direction and one transverse to the trajectory direction), and $\lambda$ (wavelength), for example. Graph 660 illustrates an example of the time varying output signal of the detector 650 associated with one object point/object image point 601a of the object/object image 601 moving relative to the spectral encoder 603 while emanating light in a narrow band of wavelengths. The electrical output signal 651 includes the spectrum of the light emanating from the object point/object image point 601a. The detector must include at least as many elements 650a along the trajectory direction as there are object points/object image points to resolve within the instantaneous field of view of the detector 650 along the trajectory direction. For example, in the case of flow cytometry, if N particles are expected to emanate light that will reach the detector simultaneously, the detector should have at least N resolution elements along the trajectory direction of the particles as imaged on the detector, so the particle signals can be disambiguated.

Optionally, the spectral encoder 603 can include a second lens 612, e.g., arranged between the second polarizer 632 and the detector 650, or between the waveplate and the second polarizer. The lens 612 is configured to image the light 605b from the waveplate onto the detector 650 as indicated by dashed line 605b.

Optionally, the spectral encoder 603 includes one or more optical filters which are not shown in FIG. 6. For example, in various embodiments, an optical filter may be arranged anywhere in the light path between the object/object image 601 and the detector 650, e.g., between the second polarizer 632 and the detector 650. The optical filter can serve to limit the bandwidth of the light incident on the detector 650 to a bandwidth range of interest which simplifies signal processing. In some cases, limiting the bandwidth of the light received by the detector allows full recovery of the spectral information from the optical interferogram generated by the motion of the object, even if the electrical signal generated by the interferogram is sampled below the Nyquist limit (two samples per interference fringe).

As previously discussed, in one example, the waveplate is a Wollaston prism comprising two prism halves. Each half of the Wollaston prism has a wedge angle α, where wedge angle is defined as the angle between the front face of the prism half which is typically arranged normal to the principal optical axis of the spectral encoder, and the interior face where the two halves of the prism are cemented together. The slow axes of the Wollaston prism may be oriented at about 45 degrees with respect to the axes of the polarizers. The wedge direction of the prism is defined as the direction, in a plane parallel to the front face of the prism, along which the thicknesses of the two halves of the prism trade off the fastest. It is preferable to align the prism's wedge direction with trajectory of relative motion between the object/object image 601 and the spectral encoder 603, and to align the slow axes of the prism at ±45° to the wedge direction. If the desired spectral resolution at wavelength $\lambda$ is $\lambda/N$, N fringes must be recorded as an object point/object image point 601a traverses across the field of view of the spectral encoder. If the travel distance of the object point/object image point along the wedge direction of the Wollaston prism is L, and if the prism material has birefringence $\Delta n$, the wedge angle of the Wollaston prism should be $\alpha \approx N\lambda/2L\Delta n$. The maximum spectral bandwidth is limited by the sample rate of the detector signal, which must be fast enough to record the observed fringes. The spectral bandwidth is also limited by the size of the detector pixels along the trajectory direction. If the size of the detector pixels along the trajectory direction is d, then the maximum number of fringes that can be recorded by the detector of size D along the trajectory direction is approximately D/2d. Therefore, it is important that this number D/2d corresponding to the maximum possible number of fringes to record is greater than the maximum number expected at the minimum wavelength to be detected. The spectral encoder described herein includes a polarizer-waveplate-polarizer sandwich that creates a position-dependent polarization interferometer. The first polarizer polarizes the incoming light; the waveplate induces a retardance (and hence wavelength-dependent phase shift) between the two orthogonal polarization components that depends on the position of an object along a trajectory; and the second polarizer changes the resulting wavelength-dependent polarization state into a wavelength dependent intensity. As light emanates from an object point/object image point of the object/object image at different points along the trajectory, the light experiences different retardances and thus generates an interferogram that can be Fourier transformed to provide an optical spectrum.

A processor (not shown in FIG. 6, but shown in FIG. 1A) can be coupled to receive the electrical output signals 651 from the each of the detector elements 650a of the detector 650. In some embodiments, each of the detector elements 650a of the detector 650 may be coupled to provide separate parallel output signals to the processor. Alternatively, the output signals 651 from the multiple detector elements 650a may be multiplexed. The processor processes the detector output signal(s) to extract information about the object/object image 601. Light interference fringes created by the motion of the object 601 and detected by the detector 650 can be resolved by the processor. The outputs of the detector elements can be combined to form a time-varying interferogram corresponding to a single object point/object image point. This time varying interferogram can be processed, e.g., such as by Fourier transformation or other transformation, to determine the optical spectrum of the light emanating from the object point/object image point.

Figure 7A:
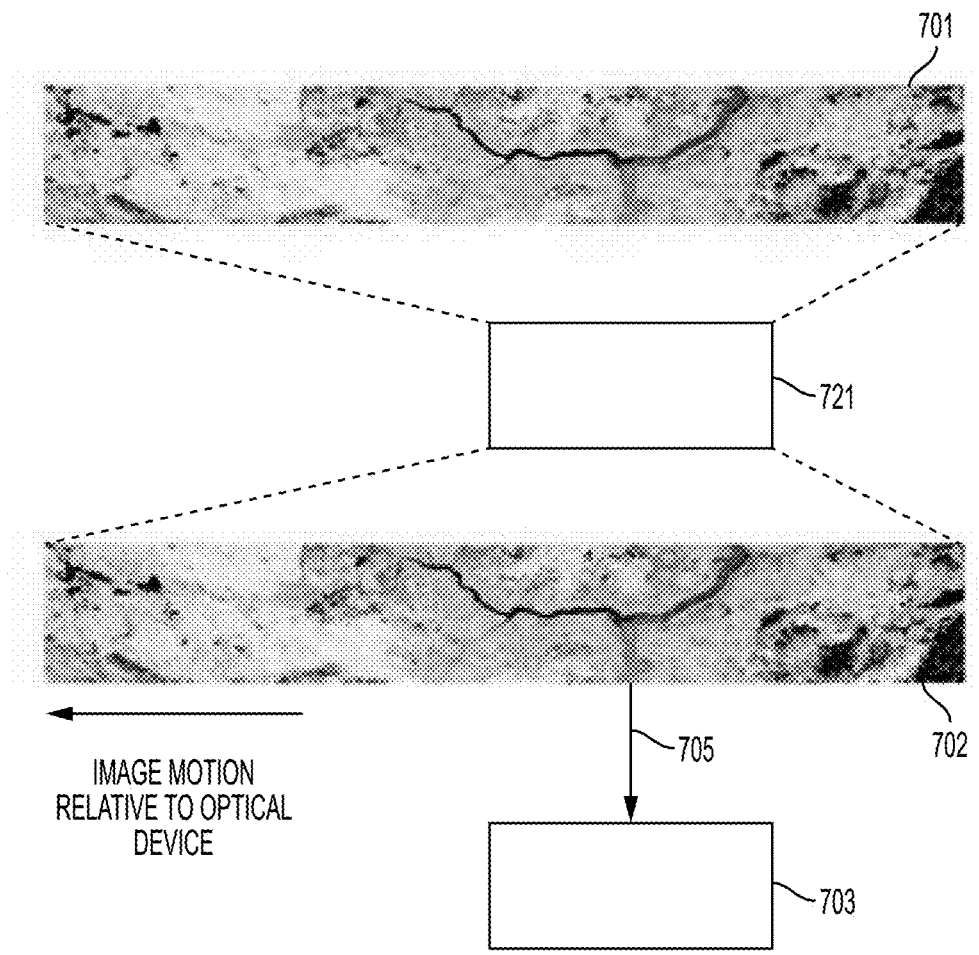
FIG. 7A is a block diagram of an imaging system comprising a spectral encoder and an optical component that causes an image of an object to move across the spectral encoder.

As previously discussed, the approaches disclosed herein rely on relative motion between the object/object image and the spectral encoder. FIG. 7A illustrates a system comprising a spectral encoder 703 and an optical component 721, such as a movable mirror or other device that causes an image 702 of the object 701 to move across the spectral encoder 703. In this scenario, the object 701 itself may be stationary with respect to the spectral encoder 703. The spectral encoder 703 is configured to determine spectral information about the light 705 emanating from the object/object image 701 and redirected by the optical component 721 to the spectral encoder 703.

Figure 7B:
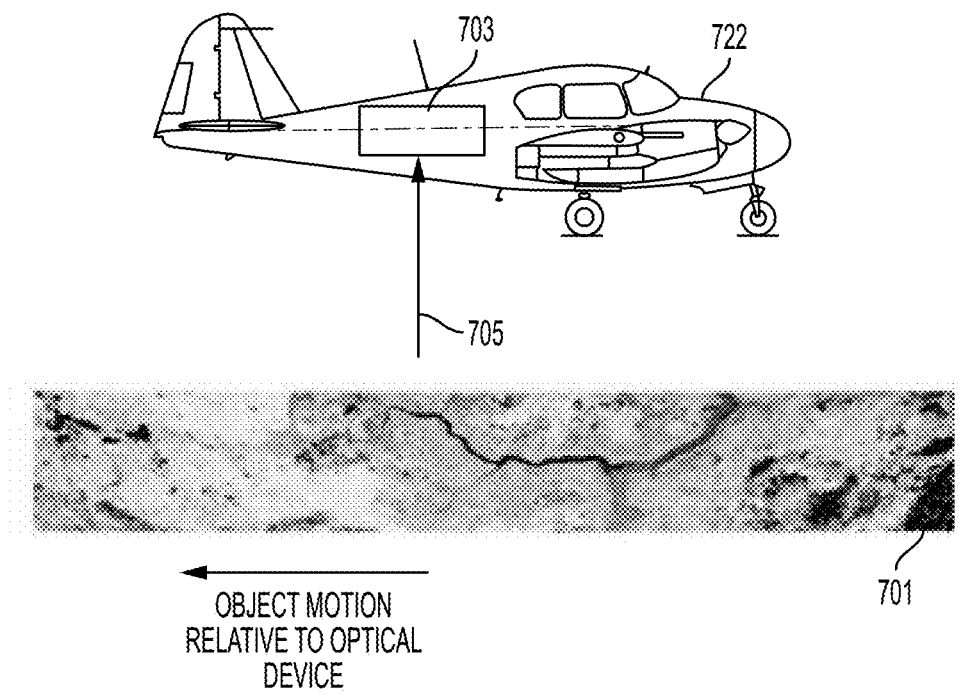
FIG. 7B illustrates a block diagram of an imaging system comprising a spectral encoder and a movement device configured to cause relative movement between the object and the spectral encoder.

FIG. 7B illustrates another system comprising a spectral encoder 703 and a chassis, vehicle (e.g., automobile or airplane), or other movement mechanism 722 configured to cause relative movement between the object 701 and the spectral encoder 703. The embodiment of FIG. 7B represents the movement device 722 as an airplane. The spectral encoder 703 is configured to obtain spectral information about the light 705 emanating from the object/object image 701 based on the relative movement between the object/object image 701 and the spectral encoder 703 as discussed herein.

Figure 8A:
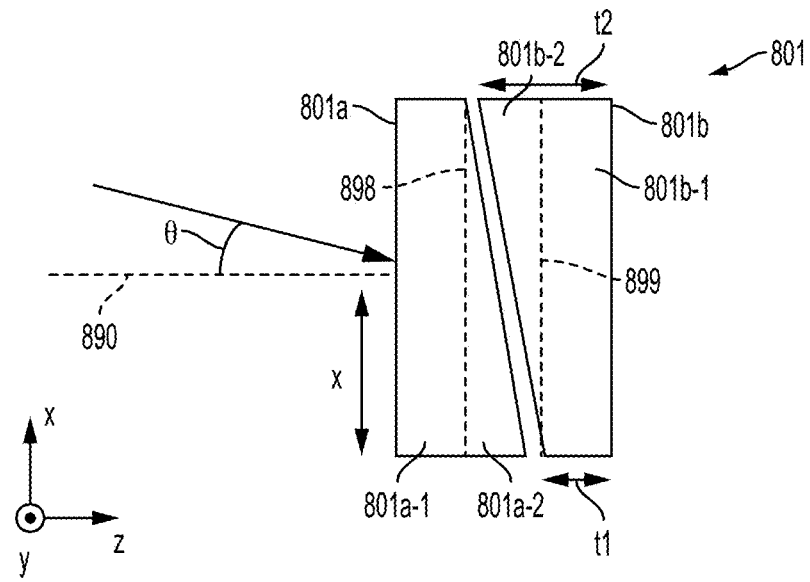
FIG. 8A shows a Wollaston prism comprising first and second halves.

In some implementations, the compactness of an imaging system that includes the spectral encoder as described herein can be enhanced through the use of a high numerical aperture lens to image the light emanating from the object/object image onto the waveplate. The retardance of each point of the waveplate depends on the angle of incident light on the waveplate at that point. The angle of incident light varies over the rays that are detected by one detector element in a high numerical aperture imaging system; therefore, the retardance also varies over the rays that are detected by that detector element, leading to loss of modulation depth or contrast in the time-varying interferogram that is recorded. In some implementations, it may be desirable to decrease the sensitivity of the retardance of the waveplate to the variation in angles of the rays that are focused onto one detector element. There are several approaches that can reduce this angular sensitivity. Consider the case of a Wollaston prism which, when used as a waveplate, has a retardance that varies as a function of position along its wedged members. FIG. 8A shows a Wollaston prism 801 comprising first and second halves 801a, 801b. The optical axis of the first half 801a is oriented along the x direction; the optical axis of the second half 801b is oriented along the y direction; and the imaging axis 890 of the spectral encoder 801 is oriented along the z axis. The prism 801 has position dependent retardance along the x axis due to the wedge shapes of the prism halves 801a, 801b and an inherent dependence based on the angle, $\theta$, of input light with respect to the z axis. Only the wedged portions of the prism halves 801a, 801b contribute to the position-dependent retardance. As indicated by dashed lines 898, 899 each half 801a, 801b of the prism 801 is made up of a rectangular solid 801a-1, 801b-1 and a triangular wedge 801a-2, 801b-2. The position dependence of the prism 801 may be due only to the triangular wedges 801a-2, 801b-2 in each half 801a, 801b, while the angular dependence may be due to the whole prism 801 including the rectangular portions 801a-1, 801b-1.

Figure 8B:
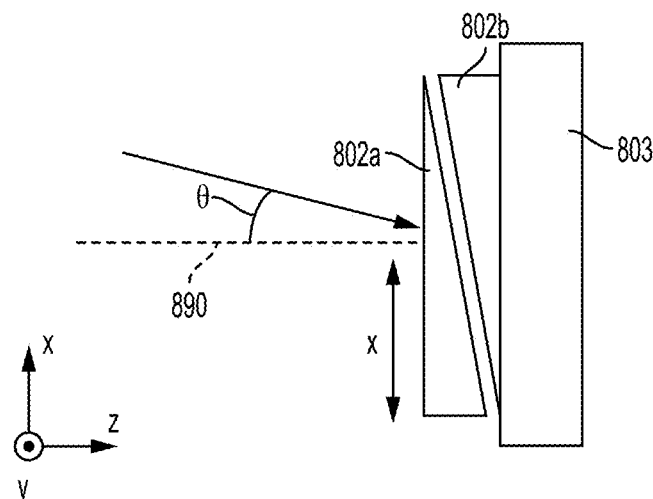
FIG. 8B shows a Wollaston prism comprising first and second halves bonded to a substrate of optically isotropic material.

In some implementations, the angular dependence of a Wollaston prism used in a spectral encoder may be reduced by thinning the prism halves, e.g., by removing or reducing the rectangular portions 801a-1, 801b-1 as illustrated in FIGS. 8A and 8B. In some embodiments, the prism halves are thinned such that only as much material as is needed to make a wedge remains. FIG. 8B illustrates a Wollaston prism 802 comprising first and second halves 802a, 802b that do not include substantial rectangular portions. In various embodiments, the thickness, $t_1$, of the thinnest portion of a prism half (see FIG. 8A) may be less than 90%, less than 75%, less than 50%, or less than 25% of the thickness, $t_2$, of the thickest portion, of the prism half. In some implementations, the difference in $t_1$ and $t_2$ may be on the order of microns, e.g., between 1 µm and 500 µm. To facilitate handling such a thin prism, it may be necessary to bond one or both halves 802*a*, 802*b* to a substrate 803 of optically isotropic material as shown in FIG. 8B.

Figure 9A:
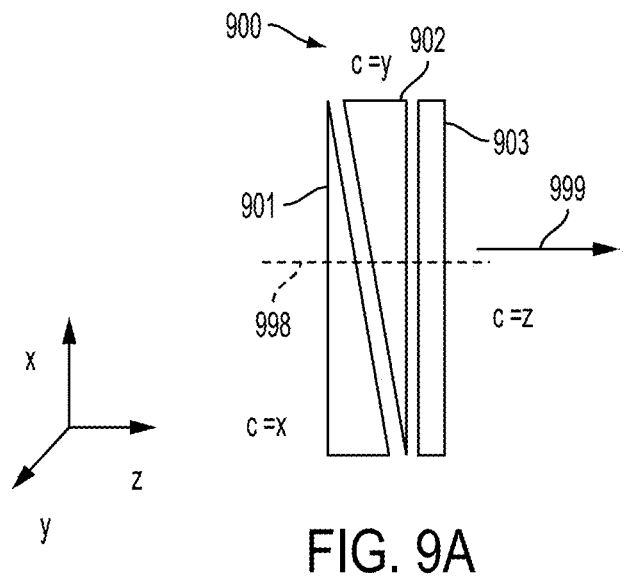
FIG. 9A shows a Wollaston prism including prism halves and an additional layer of birefringent material arranged along the imaging axis of the spectral encoder.
Figure 9B:
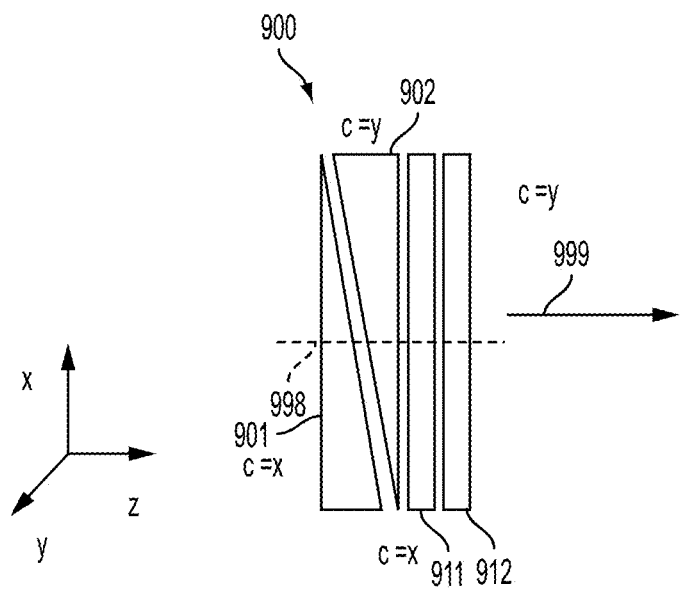
FIG. 9B shows a Wollaston prism including prism halves with additional layers of birefringent material spectral encoder.

In some implementations, angular sensitivity of the Wollaston prism can be reduced by compensating some of the angular dependencies with one or more additional layers of birefringent material disposed proximate to one or both sides of the Wollaston prism, as illustrated in FIGS. 9A and 9B. The techniques shown and described in connection with FIGS. 9A and 9B can be employed in addition to or as alternatives to the approach described in FIGS. 8A and 8B.

FIG. 9A shows a Wollaston prism 900 including prism halves 901, 902 and an additional layer 903 of birefringent material arranged along the imaging axis 999 of the spectral encoder. In this example, the optical axis of the first half 901 of the Wollaston prism 900 is oriented along the x axis; the optical axis of the second half 902 of the Wollaston prism 900 is oriented along the y axis; and the optical axis of the third layer 903 is oriented along the imaging axis 999 of the spectral encoder (the z axis in FIG. 9A). The additional layer 903 of birefringent material may be made of the same material as the Wollaston prism halves 901, 902. In some embodiments, the third layer 903 may have a thickness that is substantially constant and substantially equal to one of the Wollaston prism halves 901, 902 at their midpoint indicated by dashed line 998. The thickness of the third layer 903 may be substantially equal to an average thickness of one of the Wollaston prism halves 901, 902.

The third layer 903 compensates for some of the angular dependencies of the Wollaston prism 900. This can be seen by considering the angular dependence of the index of refraction of the extraordinary ray (polarized in the x-direction) for a ray in the xz-plane making an angle θ with respect to the z-axis, traveling through a uniaxial birefringent medium with optical axis along the x-axis. The index of refraction of the extraordinary ray is given by $$n'_e(\theta) = \left(\frac{\cos^2 \theta}{n_e^2} + \frac{\sin^2 \theta}{n_o^2}\right),$$

with $n_e$ and $n_o$ the extraordinary and ordinary indices of the birefringent medium. If the ray then travels through a medium with optical axis along the z-axis of the same thickness, with index of refraction of the extraordinary ray given by $$n''_e(\theta) = \left(\frac{\cos^2 \theta}{n_o^2} + \frac{\sin^2 \theta}{n_e^2}\right),$$

then the average index of refraction seen by the extraordinary ray is $$\frac{n'_e(\theta) + n''_e(\theta)}{2}$$

rather than just $n'_e(\theta)$. Near θ=0, the angular dependence is thus reduced to $$\frac{\left(n_e + n_o - \frac{n_e^3}{n_o^2} - \frac{n_o^3}{n_e^2}\right)}{n_e - \frac{n_e^3}{n_o^2}}$$

of the original angular dependence, which works out to about 28% of the original angular dependence when using the birefringent medium calcite.

FIG. 9B illustrates another technique for decreasing the angular sensitivity of the Wollaston prism. FIG. 9B shows a Wollaston prism including prism halves 901, 902 with additional layers 911, 912 of birefringent material disposed along the imaging axis 999 of the spectral encoder. The additional layers 911, 912 are arranged to compensate for some of the angular dependencies of the Wollaston prism 900. Each layer 911, 912 has a thickness that is substantially constant and substantially equal to an average thickness of one prism half 901, 902. At the midpoint of the Wollaston prism halves (which is the midpoint of the spectral encoder), the thickness of each prism half 901, 902 and each additional layer 911, 912 may be substantially equal. In this example, the imaging axis 999 of the spectral encoder is oriented along the z axis, the optical axis of the first half 901 of the Wollaston prism 900 is oriented along the x axis; the optical axis of the second half 902 of the Wollaston prism 900 is oriented along the y axis. Layer 911 has equal in magnitude and opposite in sign birefringence as the Wollaston prism half 901, having its optical axis oriented along the x axis. Layer 912 has equal in magnitude and opposite in sign birefringence as the Wollaston prism half 902, having its optical axis oriented along the y axis. In this arrangement, angular sensitivity introduced by the first half 901 of the Wollaston prism is compensated by layer 911 and angular sensitivity introduced by the second half 902 of the Wollaston prism is compensated by layer 912. The angular sensitivity is only perfectly cancelled at the midpoint of the prism where all the layers are equal in thickness.

Some configurations may benefit from considering the orientation of the optical axes of the Wollaston prism halves with respect to the wedge direction. In some instances, it may be advantageous to have the crystal direction of one half of the Wollaston prism parallel to the wedge direction and the direction of the other half of the Wollaston perpendicular to the wedge direction as indicated in FIG. 6. In other implementations, it may be advantageous to have the crystal directions of both Wollaston prism halves at 45 degrees to the wedge direction (yet perpendicular to each other).

In some implementations, the waveplate may be made of one or more axially oriented birefringent layers, e.g., made of polymer or polyester film such as biaxially-oriented polyethylene terephthalate (boPET) or other axially oriented films, that can be manufactured with a gradient of birefringence. In these implementations, the amount of excess birefringent material contributing to an angular dependence of the retardance is reduced relative to the amount of birefringent material contributing to the position dependence of the retardance. For example, as shown in FIGS. 10A through 10C, the waveplate may comprise two films, each film having a birefringence gradient. A specified birefringence gradient in the film may be obtained by stretching the film, for example. FIG. 10A shows a cross sectional view of a waveplate 1000 made of first and second films 1001, 1002, wherein each film 1001, 1002 has a birefringence gradient. FIG. 10B is a front-facing view along the axis 1099 showing the birefringence at many points of the first layer 1001 and FIG. 10C is a front facing view along the axis 1099 showing the birefringence at many points of the second layer 1002, where arrows 1091 and 1092 indicate the magnitude of birefringence and alignment of the slow axis with longer arrows representing greater birefringence. The two layers 1001, 1002 are bonded together with the slow axis of one of the layers 1001, 1002 being oriented substantially perpendicular to the slow axis of the other layer 1002, 1001 as indicated in FIGS. 10B and 10C. The two layers 1001, 1002 therefore create a waveplate where the zero retardance point can be adjusted to be in the middle of the waveplate. The zero retardance point is the point at which two orthogonally polarized rays of light, traveling along the same geometrical path, experience the same optical path length as they pass through the waveplate.

Figure 10D:
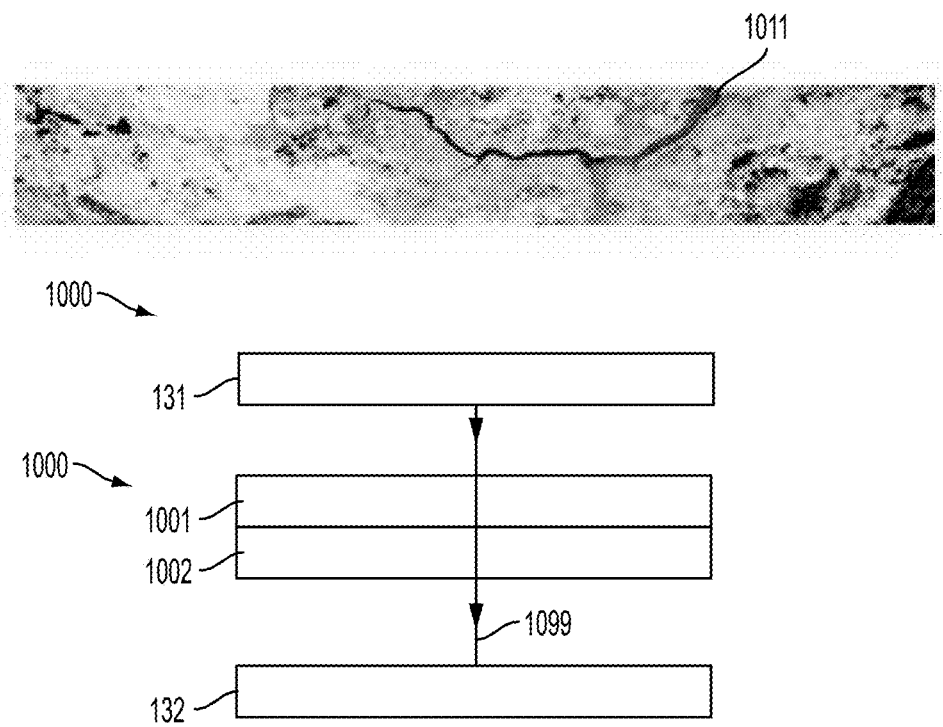
FIG. 10D illustrates a spectral encoder comprising the waveplate of FIGS. 10A through 10C sandwiched between polarizers.

FIG. 10D illustrates a spectral encoder comprising the waveplate 1000 made of the two layers 1001, 1002 sandwiched between polarizers 131, 132 disposed relative to an object/object image 1011. The spectral encoder illustrated in FIG. 10D may be less expensive and/or easier to manufacture when compared with calcite or other crystal-based waveplates. In some embodiments, a waveplate may be or comprise a single layer of birefringent material that is formed to have a constant birefringence gradient along the trajectory direction of the object/object image, with a zero-retardance point.

Figure 11:
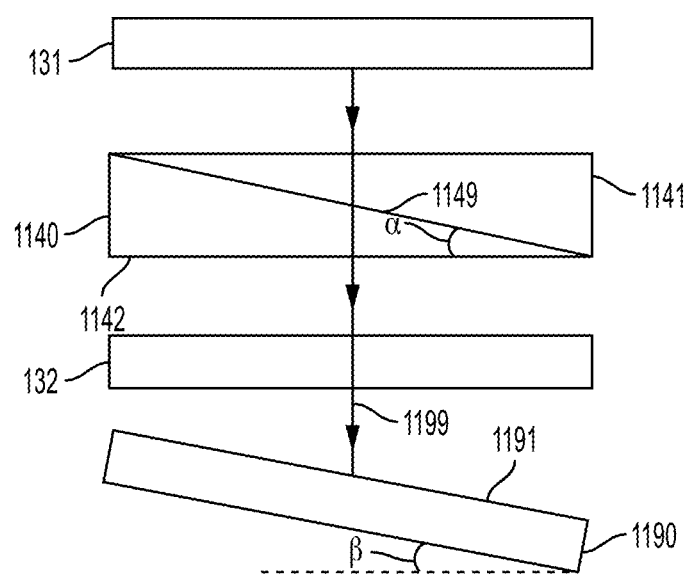
FIG. 11 depicts a spectral encoder having a detector tilted at an angle to compensate for fringe localization of the Wollaston prism.

Another consideration is the localization of the fringe plane created by interfering two polarizations of light. With reference to FIG. 11, the fringe plane is localized inside the Wollaston prism (for example) near the interface 1149 between the two halves 1141, 1142, and at an angle $\beta = \alpha^* (n_e + n_o)/2n_e n_o$. Therefore, when the light receiving surface of the detector is substantially perpendicular to the principal optical axis 1199 of the spectral encoder, there may be a slight tilt between the detector and the fringe plane which is equal to fi as calculated above. The slight tilt can be accommodated (for example) by tilting the detector so that the interface of the Wollaston prism halves is substantially parallel to the light receiving surface of the detector. Or, it may be compensated for by other means known in the art, such as with combinations of Wollaston prisms that change the localization plane of the fringes. FIG. 11 shows a Wollaston prism 1140 between polarizers 131, 132. The detector 1190 is tilted at an angle $\beta$ so that the light receiving surface 1191 of the detector 1190 is substantially parallel to the fringe localization plane of the Wollaston prism 1140. Alternatively, the detector could be oriented substantially perpendicular to the principal optical axis 1199 of the spectral encoder and the Wollaston prism could be tilted, e.g., so that the fringe localization plane is substantially parallel to the receiving surface of the detector.

There may be some considerations regarding the imaging setup and/or lenses used for a hyperspectral imaging system that includes a spectral encoder in accordance with embodiments discussed herein. First, the imaging setup and/or lenses must be corrected for chromatic aberrations. It is ideal if the object to be imaged, e.g., geographical scene, appears flat to the spectral encoder. This can be achieved if the distance from the spectral encoder to the scenery is sufficiently large relative to height variations of the scenery. This can also be achieved by using a telecentric lens as an initial imaging element that images the geographical scene (or other object) onto the waveplate. If the object is not sufficiently flat, then object points/object image points moving at the same linear speed with respect to the spectral encoder have different magnifications and thus move at different speeds across the waveplate. In order to correct for this phenomenon, the heights of the object points/object image points can be inferred, e.g., using a secondary camera or LiDaR system, and orthorectification can be performed. Spectral information could be calculated from the partial interferogram data obtained from a given object point/object image point. Note that the full interferogram for a given object point/object image point may not be able to be obtained; as object points/object image points further away may be obscured by object points/object image points that are closer, an interferogram corresponding to an object point/object image point that is further away may have to be cropped prior to Fourier transformation so obscurations from closer object points/object image points do not cause artifacts in the calculated spectrum.

If a second lens is not included to image the waveplate onto the spatially resolving detector, and instead the detector is placed (for example) directly behind the waveplate, it may be advantageous to dither the first lens between states optimized for spectral resolution (e.g., focused at the wedge interface of the Wollaston) and spatial resolution (focused on the detector).

As mentioned earlier, a spatially resolving detector used in flow cytometry applications allows the imaging system to separate overlapping particles. In the spectral encoder embodiments disclosed herein, the polarizers can be replaced with beamsplitters to keep all orthogonal polarizations of light. These beamsplitters may be Savart plates (parallel path beamsplitters) to keep the system compact. Alternatively, they can comprise Wollaston prisms or other polarizing beamsplitters.

In various embodiments, all or part of the optical device and/or processor may be implemented in optical and/or electronic hardware. In some exemplary embodiments, functions of the processor may be implemented in firmware, software running on a microcontroller or other device, or any combination of hardware, software and firmware.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A method, comprising;
receiving emanating light from at least one point (object/image point) of an object or image of the object as the object/image point moves along a trajectory relative to a waveplate of a spectral encoder , the trajectory having a length, L, within a field of view of the spectral encoder, the object/image point having a diameter, d, along the trajectory;
for the at least one object/image point:
simultaneously detecting positional information and obtaining spectral information for the object/image point comprising:
generating a position-dependent polarization interferogram from the emanating light, the position-dependent polarization interferogram comprising N interference fringes generated as a function of time from light at wavelength $\lambda$ emanating from the object/image point as the object/image point traverses the length L, wherein L≥2dN;
converting the position-dependent polarization interferogram into a time varying electrical output signal; and
determining spectral information corresponding to the object/image point, the spectral information determined from the time varying electrical output signal and obtained from the position-dependent polarization interferogram, the spectral information having a spectral resolution at wavelength $\lambda$ of about $\lambda/N$.

2. The method of claim 1, further comprising compensating for angular sensitivity of the waveplate.

3. The method of claim 1, further comprising at least one of:
imaging light from the object or the object image moving relative to the optical device onto the waveplate; and
imaging light from the waveplate onto the detector array.

4. The method of claim 1, wherein a zero retardance point of the waveplate is disposed at a specified position along the trajectory.

5. The method of claim 1, wherein a fringe localization plane of the waveplate coincides with a surface of a detector that converts the position-dependent polarization interferogram into the time varying electrical signal.

6. The method of claim 1, wherein determining the spectral information comprises performing a Fourier transformation of the time varying electrical output signal and determining the spectral information from the Fourier transformation.

7. The method of claim 1, wherein simultaneously detecting positional information and obtaining spectral information for the object/image point comprises:
detecting encoded spectral information corresponding to the positional information over a time duration of the relative motion between the object/image point and the spectral encoder;
acquiring the spectral information of the object/image point over the time duration of the relative motion; and
providing hyperspectral image data having one or more positional axes and a wavelength axis.

8. The method of claim 1, further comprising correcting for at least one of optical dispersion in the waveplate and angle of incidence of light received by the waveplate.

9. A system, comprising;
a spectral encoder comprising a waveplate disposed between first and second polarizers, the spectral encoder configured to receive emanating light from at least one point of an object or image of the object (object/image point) as the object/image point moves relative to the waveplate of the spectral encoder along a trajectory of length L within a field of view of the spectral encoder, the object/image point having a diameter, d, along the trajectory;
circuitry comprising:
a detector configured to:
simultaneously detect positional information and obtain spectral information for the object/image point from the spectral encoder; and
convert a position-dependent polarization interferogram generated by the spectral encoder from the emanating light into a time varying electrical signal, the position-dependent polarization interferogram comprising N interference fringes generated as a function of time from light at wavelength$\lambda$ emanating from the object/image point as the object/image point traverses the length L, wherein L≥2dN; and
a processor configured to determine spectral information corresponding to the object/image point from the time varying electrical signal at a spectral resolution at wavaelength $\lambda$ of about $\lambda/N$.

10. The system of claim 9, further comprising at least one of:
a lens configured to image light from the object or the object image moving relative to the optical device onto the waveplate; and
a lens configured to image light from the waveplate onto the detector.

11. The system of claim 9, wherein the detector and the waveplate are arranged such that there is a fixed correspondence between each detector element and at least one retardance of the waveplate.

12. The system of claim 9, further comprising a birefringent layer disposed between the object/image point and the detector, the birefringent layer having a substantially constant thickness and an optical axis arranged along an imaging axis of the spectral encoder.

13. The system of claim 12, wherein:
the waveplate is a Wollaston prism comprising first and second halves; and
a thickness of the birefringent layer is equal to one half a thickness of the Wollaston prism.

14. The system of claim 9, wherein:
the waveplate comprises a Wollaston prism comprising first and second prism halves, each of the first and second prism halves having a first thickness, t1, along a thinnest portion of the wedge and a second thickness, t2, along a thickest portion of the wedge and t1 is less than 75% of t2.

15. The system of claim 9, wherein:
the waveplate is a Wollaston prism; and
further comprising a first layer and a second layer, birefringence of the first layer being substantially equal in magnitude and opposite in sign with respect to birefringence of a first Wollaston prism half and birefringence of the second layer being substantially equal in magnitude and opposite in sign to birefringence of a second Wollaston prism half, wherein thicknesses of the first layer and second layer are substantially equal to average thicknesses of the first half and second half of the Wollaston prism, respectively.

16. The system of claim 9, wherein a fringe localization plane of the waveplate coincides with a surface of the detector.

17. The system of claim 9, wherein:
there is a predetermined correspondence between each detector element of the detector and a position on the waveplate having a particular optical retardance; and
the processor circuitry is configured to determine wavelength information about the object based on the predetermined correspondence.

18. The system of claim 17, further comprising a mirror array having multiple movable mirrors wherein the mirror array is configured to provide the predetermined correspondence.

19. The system of claim 9, further comprising a movement mechanism configured to move the object or object image relative to the optical device.

20. The system of claim 19, wherein the movement mechanism is a vehicle.

* * * * *